United States Patent [19]
Jackson et al.

[11] Patent Number: 5,593,111
[45] Date of Patent: Jan. 14, 1997

[54] SAFETY SYSTEM FOR REMOVING A RIDER FROM A VEHICLE BY DEPLOYING A PARACHUTE

[76] Inventors: Troy Jackson, 3265 Newkirk St., Philadelphia, Pa. 19129; Joseph S. Leak, Sr., 3931 N. 17th St., Philadelphia, Pa. 19140

[21] Appl. No.: 276,338

[22] Filed: Jul. 18, 1994

[51] Int. Cl.⁶ .............................. B64D 17/80; B64C 9/32
[52] U.S. Cl. ................. 244/110 D; 244/113; 244/137.3; 244/143; 244/147; 280/733
[58] Field of Search ........................ 244/16, 113, 110 D, 244/122 AF, 122 AG, 137.2, 137.3, 137.1, 143, 147, 149, 151 B, 900, 903, 904; 180/282, 272, 271; 280/810, 733

[56] References Cited

U.S. PATENT DOCUMENTS

| | | | |
|---|---|---|---|
| 3,481,568 | 12/1969 | McIntyre et al. | 244/122 R |
| 3,614,132 | 10/1971 | Ashworth | 280/289 |
| 3,671,933 | 6/1972 | Barnes | 340/52 H |
| 3,921,944 | 11/1975 | Morrison | 244/143 |
| 3,930,667 | 1/1976 | Osuchowski et al. | 280/150 AB |
| 3,993,323 | 11/1976 | Lussier | 280/289 R |
| 4,059,852 | 11/1977 | Crane | 280/733 |
| 4,557,439 | 12/1985 | Puskas | 244/151 B |
| 4,634,136 | 1/1987 | Alexander | 280/213 |
| 4,641,124 | 2/1987 | Davis | 340/64 |
| 4,657,207 | 4/1987 | Poling | 244/2 |
| 4,984,821 | 1/1991 | Kim et al. | 280/728 |
| 5,078,335 | 1/1992 | David | 244/2 |
| 5,091,992 | 3/1992 | Pusic | 280/733 |
| 5,217,186 | 6/1993 | Stewart et al. | 244/142 |
| 5,362,098 | 11/1994 | Guill | 244/122 AG |

*Primary Examiner*—Andres Kashnikow
*Assistant Examiner*—Virna Lissi Mojica
*Attorney, Agent, or Firm*—Woodcock Washburn Kurtz Mackiewicz & Norris

[57] ABSTRACT

Methods and apparatus for reducing the velocity of a rider in or on an open cockpit vehicle when the rider is thrown from the vehicle are disclosed. The present invention provides a drag-reducing device such as a parachute or parawing that is affixed to the rider so that when a crash occurs, the rider is slowed down after ejection and therefore more likely to survive the crash without severe injuries. The present invention is preferably used in conjunction with a motorcycle and includes a sensor system for sensing the imminence or occurrence of a crash an/or the ejection of the rider from the vehicle. A transmitter receiver system is used to relay a signal to a deployment system that is attached to the rider as part of a system containing the drag inducing device, which rapidly deployed, thereby causing the velocity of the ejected rider to be reduced and providing the further benefit of lifting the rider away from the crash site.

20 Claims, 5 Drawing Sheets

SAFETY SYSTEM FOR REMOVING A RIDER FROM A VEHICLE BY DEPLOYING A PARACHUTE

The present invention relates to vehicle safety, and in particular relates to systems for removing a rider from a vehicle such as a motorcycle when a crash is imminent or occurring.

BACKGROUND OF THE INVENTION

Motorcycle safety is of great concern, as is all vehicle safety, however, motorcycle riders are not surrounded by the vehicle and are not protected by steel frames, air bags, seat belts, and the like. Much of the effort to date has been expended in assuming that a rider and/or passengers will come into contact with the pavement or another vehicle at high speeds after being ejected from the motorcycle. Consequently, current safety items for motorcycles include protective clothing to reduce abrasions, and sophisticated helmets that protect the skull and cushion the shock of impact.

Others have attempted to improve upon the protective clothing and helmet concept, but these efforts have still retained the fundamental concept that the vehicle occupant will contact an immovable object at high speed. For example, U.S. Pat. No. 3,930,667—Osuchowski et al. discloses an inflatable crash suit which will inflate upon separation of the rider from the motorcycle. Another improvement to conventional protective clothing is disclosed in U.S. Pat. No. 4,984,821—Kim et al., which discloses an inflatable crash suit and gas expansion system.

It would, however, be desirable to reduce the risk of injury to a vehicle occupant by reducing his or her velocity so that contact with the road surface or an object results in less damage. It would also be desirable to remove a vehicle occupant from the immediate vicinity of the vehicle, thereby avoiding contact between the occupant and the object the vehicle strikes, e.g., another vehicle, a tree, etc. Thus, it is an object of the present invention to provide improved methods and apparatus for increasing the likelihood that an occupant on a vehicle such as a motorcycle will survive a crash and survive with a lesser degree of injury. It is a further object of the present invention to provide a system whereby a vehicle occupant is removed from the vehicle upon the occurrence of a crash and the velocity of the occupant is reduced relative to the velocity of the vehicle prior to the crash.

It is known that parachutes, parawings, airfoils, drag chutes, streamers or other devices attached to a moving object will create drag and reduce their velocity. For example, U.S. Pat. No. 3,993,323—Lussier discloses a spring ejected drag parachute attached to a bicycle. U.S. Pat. No. 5,217,186—Stewart et al. discloses a parachute attached to the torso of a person for providing an impedance to a rapidly moving person, animal or vehicle.

SUMMARY OF THE INVENTION

It has now been found that the objectives described above and other advantages can be achieved by removing the rider from the vicinity of a motorcycle or similar vehicle immediately prior to or upon the occurrence of an accident by the deployment of a parachute worn as part of the rider's protective gear. In one embodiment, sensors would detect a condition such as an excess degree of tilt and/or a decrease in speed that would indicate an accident is imminent or is occurring. The parachute would then be deployed using either a smaller drag chute or an explosive charge, preferably similar to the inflation system for an automobile air bag. In another embodiment, the rider is tethered to the motorcycle and when the rider is thrown from the vehicle as the crash occurs, the parachute deploys. When the parachute deploys, the drag will remove the rider from the vehicle and decrease his speed. Ideally, the rider will float to safety, but in many instances the effects of slowing the rider and lifting the rider above the object the vehicle strikes will be enough to significantly reduce the likelihood of fatality.

The present invention thus discloses apparatus for safely removing a rider from a moving vehicle and reducing the rider's velocity, comprising a drag-inducing device affixed to the rider, a deployment system connected to the drag inducing device, and a sensor system connected to the vehicle and communicating with the deployment system. In operation, the sensor senses a crash condition and signals the deployment system to deploy the drag-inducing device. Most preferably, the apparatus of the present invention is used with a motorcycle, and also uses either a parachute or a parawing as the drag-inducing device, which is preferably connected to the rider by a harness comprised of a plurality of straps and most preferably, a stress reduction ring is disposed between the drag-inducing device and the rider.

The deployment device preferably uses a receiver, most preferably a wireless receiver, and a quantity of pressurized gas released by an activation signal from the receiver. The system of the present invention also preferably includes a sensor system that employs a transmitting unit, preferably also wireless, connected to one or more sensors, most preferably either one or more tether sensors for determining when the rider is removed from the vehicle or one or more vehicle tilt sensor devices, or both. Certain embodiments may use or additionally include one or more sensor means for determining that a crash is imminent.

Method of decreasing the velocity of a rider thrown from an open cockpit vehicle are also disclosed. In accordance with the present invention, a device comprising a drag-inducing device and a deployment system is attached to the rider and a crash sensor system is attached to the vehicle. The method then entails sensing a crash and creating a crash signal, relaying the crash signal to the deployment system, and deploying the drag-inducing device.

DETAILED DESCRIPTION OF THE PREFERRED EMBODIMENTS

As noted above, the present invention relates to motorcycle safety equipment but would have application to other open cockpit vehicles such as jet skis, snowmobiles, small all-terrain vehicles and the like. Thus, as used herein the terms "vehicle" and "motorcycle" are to be construed as including all types of open cockpit vehicles. Additionally, as also expressed above, a number of different types of drag inducing devices are known, and the names assigned to these devices sometimes are used interchangeably. Nonetheless, although the present invention is described in terms of a parachute or parawing, those terms are to be interpreted broadly to encompass any drag inducing device attached to a rider including everything from simple streamers to complex steerable airfoils or parawings.

Figure 1:
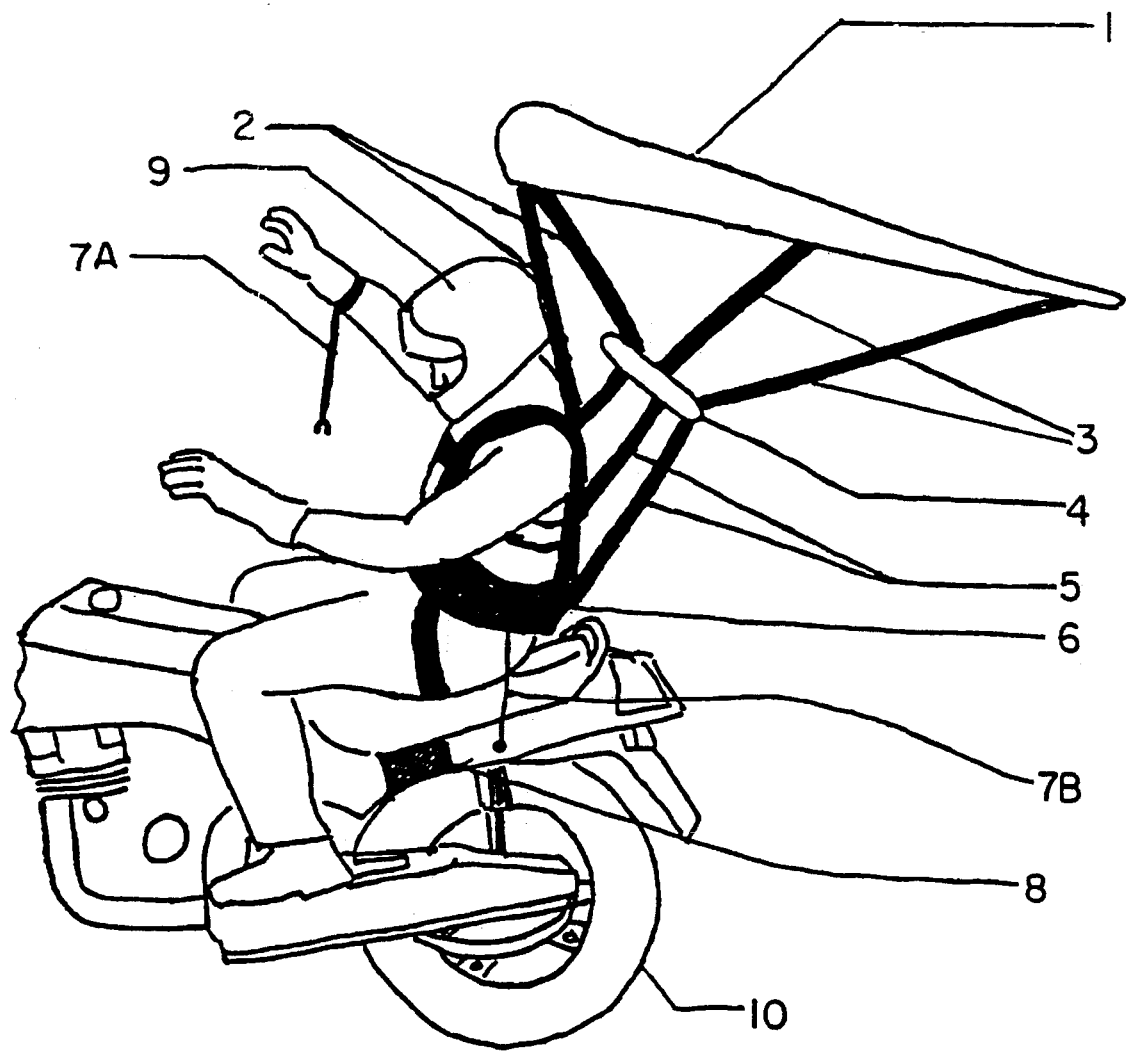
FIG. 1 is an elevation view of the system of the present invention in the deployment state.

Referring now to FIG. 1, a rider 9 is shown aboard a vehicle 10 wearing a system made in accordance with the present invention that has been deployed. In the embodiment illustrated, a harness 6 is attached to the rider, and it in turn attached to connecting straps 5. The connecting straps 5 are preferably to a stress reduction ring 4, the details of which are explained below. The connecting straps 5 are connected directly or indirectly to rigging straps 3 and pitch control straps 2 which, finally, are connected to a parawing canopy 1. In preferred embodiments, tether 7A and tether 7B extend between the rider 9 and the vehicle 10. As explained below, the tethers 7A,7B provide a system for sensing that the rider is leaving the vehicle, due to loss of control, loss of consciousness, the imminence of a crash, or the occurrence of a crash. Also shown in FIG. 1 is a tilt sensor 8 that provides a signal to deploy the parachute and thus represents another way to indicate the imminence or occurrence of a crash. Although not separately shown in FIG. 1, numerous other electronic or electro-mechanical devices, such as accelerometers, speed sensors and proximity sensors using radar or radar-like technology could alternatively or collectively be incorporated into the system to provide additional data as to the condition of the vehicle and the rider.

Figure 2:
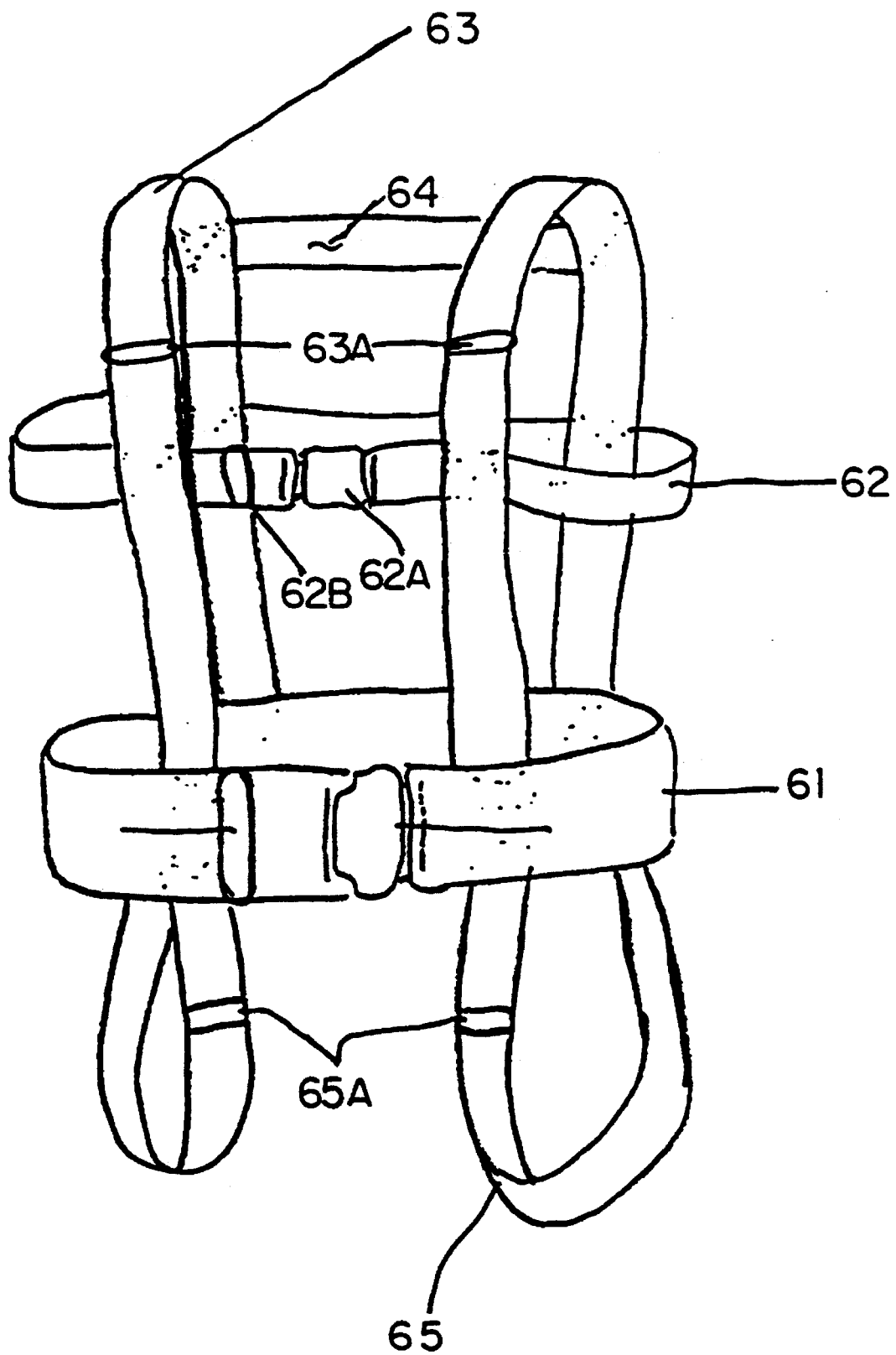
FIG. 2 is a perspective view of a preferred embodiment of a harness used in conjunction with the present invention.

A more detailed view of a preferred embodiment of the harness 6 to be worn by the rider over existing protective garments is shown in FIG. 2. The harness 6 most preferably comprises a waist belt 61, torso strap 62, shoulder strap 63, stabilizer strap 64, and leg support strap 65. The harness 6 can be secured/released by waist connector 61A and torso connector 62A. Fit is adjusted by waist adjustment 61B, torso adjustment 62B, shoulder adjustment 63A and leg support adjustments 65A. As will be readily understood by those of ordinary skill, the design of the harness should distribute the load of the occupant's body and take into account the possibility that the occupant may be unconscious, thus, it is preferable to orient the body in an upright position, i.e, legs downward.

Figure 3:
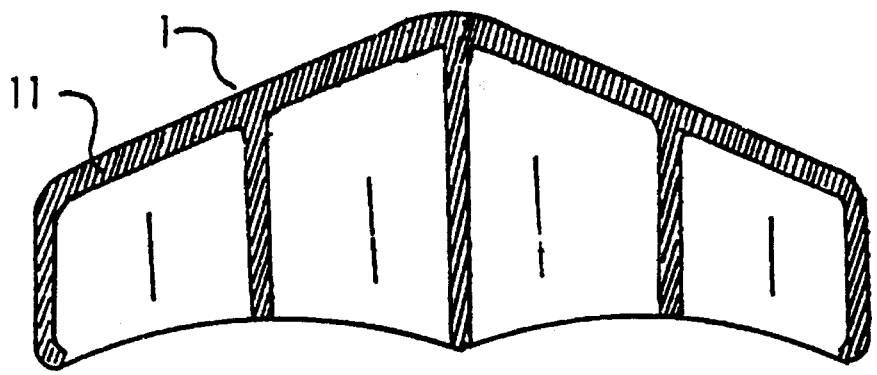
FIG. 3 is a plan view of a parawing used in preferred embodiments of the present invention.

FIG. 3 shows a fully deployed parawing 1 that represents a preferred embodiment of the present invention. As mentioned above, other types of drag-inducing devices can be substituted and, if properly designed, will be equivalent to the design shown herein for the function of reducing the velocity of the ejected occupant. In the embodiment shown in FIG. 3, pressurization chambers 11 provide rigidity by filling with compressed gas upon deployment. As mentioned above, those of ordinary skill will be able to design systems that can inflate within fractions of a second of receiving a signal or using a mechanical trigger, using, for one example, the technology used to inflate automobile air bags.

Figure 4:
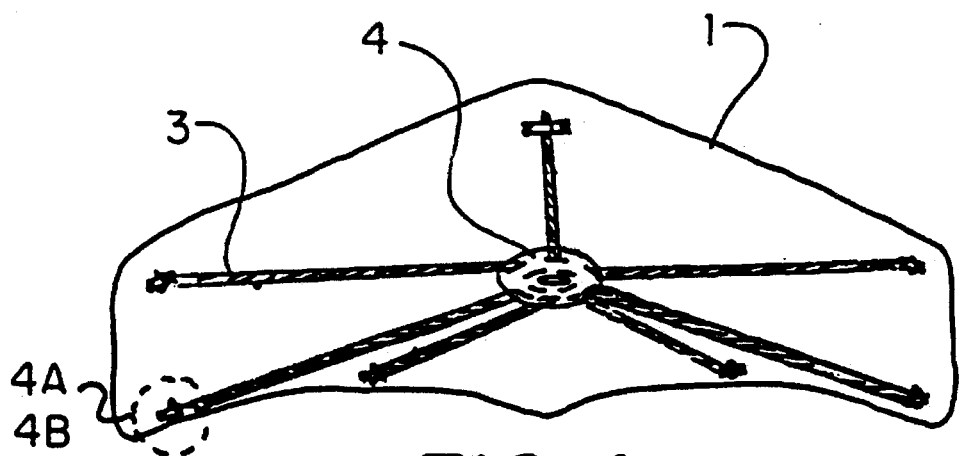
FIG. 4 is a perspective view of the parawing shown in FIG. 3 illustrating the strap arrangement and stress reduction ring.
Figure 4A:
Figure 4B:
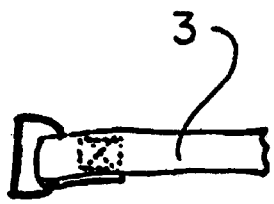
Figure 5:
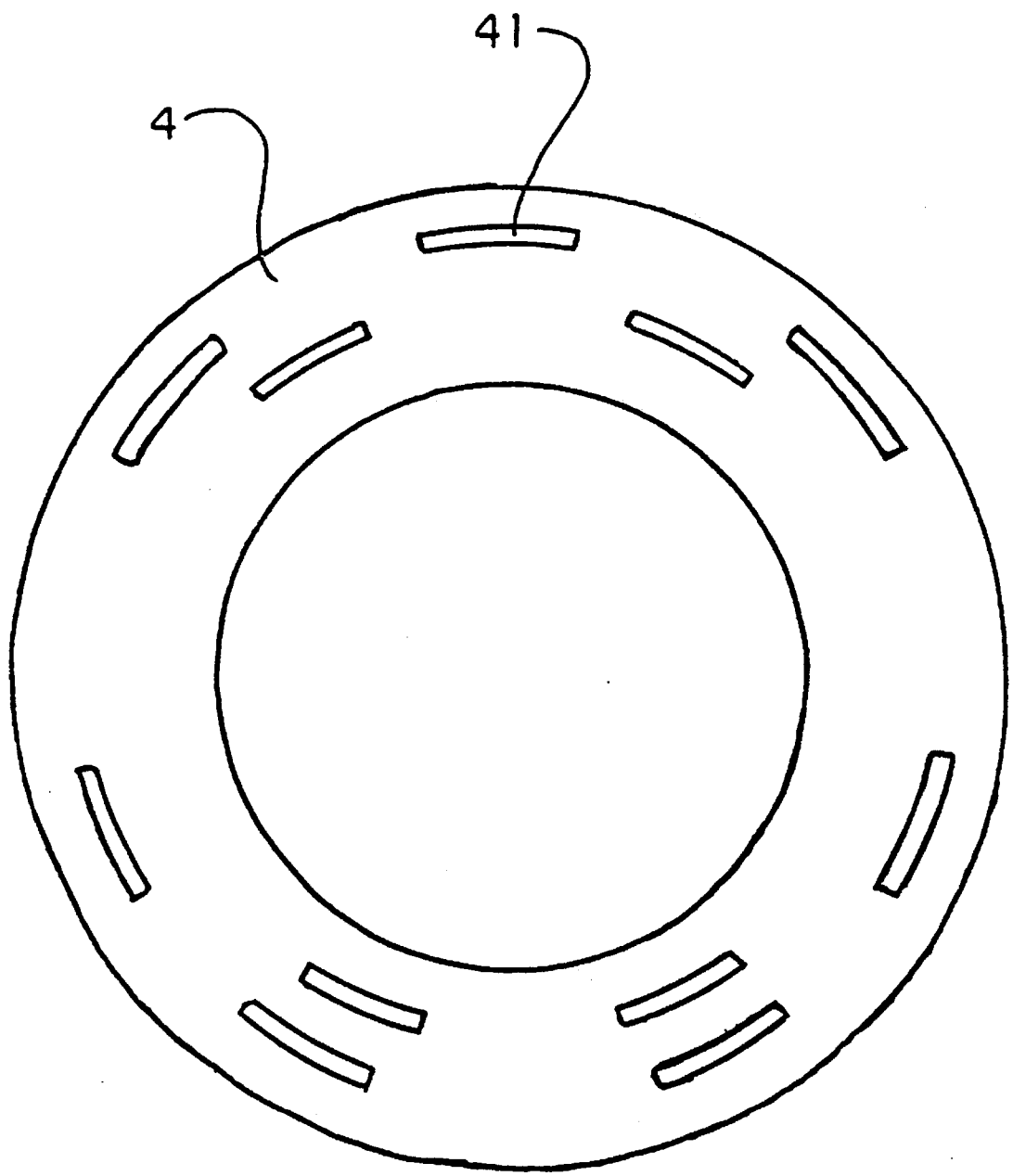
FIG. 5 is a plan view of the stress reduction ring shown in FIG. 4.

Further details of the parawing 1 shown in FIG. 3 are illustrated in FIG. 4. Preferably, a number of connection points between the parawing 1 and the harness 6 illustrated in FIG. 2 (not seen in FIG. 4) are provided. As shown in FIGS. 4A–4B, conventional D-ring attachments are used to attach the straps 3 to the parawing 1. FIG. 4 also illustrates a stress reduction ring 4, shown in greater detail in FIG. 5. As illustrated in FIG. 5, it is preferred that the stress reduction ring comprise a plurality of slots 41 through which the straps 3 connected to the parawing and the straps 5 connected to the rider harness 6 (not illustrated in FIG. 5) are arrayed so that the stress is more or less evenly distributed.

Figure 6:
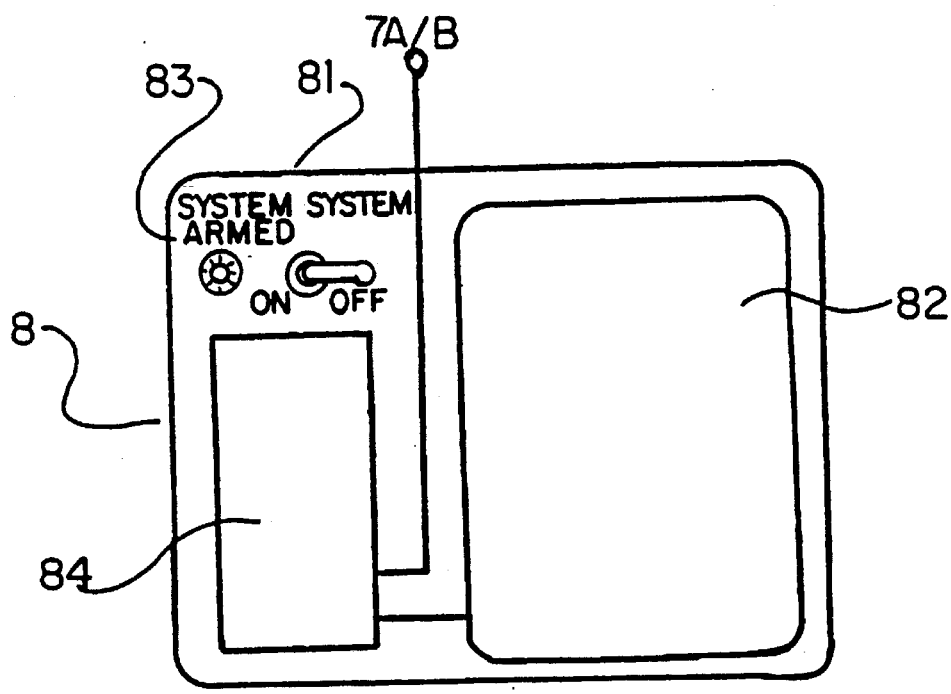
FIG. 6 is a partially schematic representation of the control and sensor device used in conjunction with preferred embodiments of the present invention.
Figure 7:
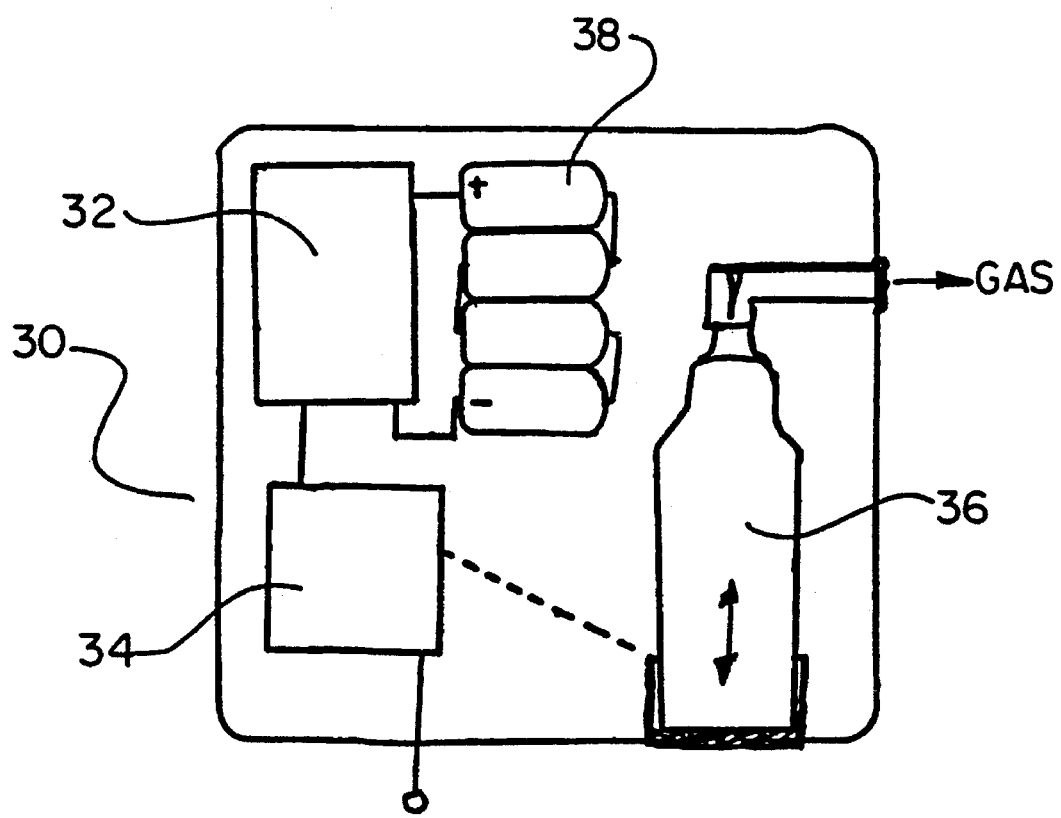
FIG. 7 is a partially schematic representation of the receiver and device used in preferred embodiments of the present invention to deploy the parawing.

The electrical, electronic and mechanical components of preferred embodiments of the present invention are shown in FIGS. 6–7. FIG. 6 shows vehicle tilt sensor unit 8. The vehicle tilt sensor unit 8 preferably includes an on/off switch 81 and an indicator light 83 to indicate that the system is armed. As shown schematically, the tilt sensor unit 8 comprises a tilt sensor device 82 that can be either a mercury switch or a mechanical proximity switching device, or other similar component. The tilt sensor device 82 is connected to a transmitter unit 84 that, as explained below, transmits a signal to activate the system when a crash is imminent.

As also seen in FIG. 6, the transmitter unit 84 is also connected to the tethers 7A,7B seen in FIG. 1. When either tether 7A,7B is disconnected, this fact is also relayed to the transmitter, which in turn sends a signal activating the deployment mechanism, described below. Most preferably, as illustrated, the vehicle tilt sensor unit 8 is mounted to the vehicle, and the relative motion between the vehicle and the rider activates the tethers 7A/7B. Finally, although it is preferable to provide a wireless transmitter to relay the deployment signal to the system, a wired connection may also be useful in certain embodiments.

Referring now to FIG. 7, there is shown a receiver and deployment module 30 which is preferably sewn into the system of the present invention. Most preferably, the receiver and deployment module 30 is attached to the rider and/or to the harness. The receiver and deployment module 30 may be an integral part of a larger assembly, such as the harness or even a garment that incorporates the harness, or the receiver and deployment module 30 may be separately strapped to the rider. Upon activation the receiver unit 32 will cause a deployment release mechanism 34 to release a pin causing a spring-loaded compressed gas cylinder 36 to slide forward, as shown by the arrows, releasing the gas into an air bag or other inflatable portion of the system (not shown in FIG. 7), thus pushing out the parawing, as illustrated in FIG. 1. The receiver and deployment module 30 most preferably includes a battery pack 38, as shown.

Thus, as will be learned from the foregoing description, the present invention is designed to remove a rider from the vehicle in the event of an out of control situation. Preferably, a vehicle tilt sensor triggers the vehicle mounted transmitter to send a signal to a receiver worn by the rider. When triggered, the receiver activates a deployment mechanism and activates a pressurization device that causes the near instantaneous deployment of a parawing or other drag inducing device that is folded or otherwise packaged within the system. Most preferably, each system made in accordance with the present invention will be factory set to ensure that only a matched receiver associated with a particular transmitter is activated, so that the use of the systems of the present invention by more than one rider in a group is permissible. Most preferably, for the same reasons and to preclude inadvertent activation, the signal emanating from the transmitter will be encoded or pulsed so as to be easily discernible from other remote control signals, noise and stray signals at that bandwidth or using similar technology, etc.. The system on/off switch on the vehicle will also help prevent false deployments. The tether switch arrangement described above preferably triggers the transmitter in the same manner as the vehicle tilt sensor device so that only one actuating signal or event is required. As mentioned above, it is preferred that the parawing deploying mechanism react in much the same way as a standard automobile air bag deployment system. The parawing pressurization chambers shown in FIG. 2 will be filled by $CO_2$ cartridges implanted in the pressure chambers of the parawing.

In operation, the system is first turned on, and upon the occurrence of the appropriate set of conditions, the transmitter is activated, either automatically or manually, and the receiver receives a signal causing it to respond by response deployment and pressurization of the drag inducing device. After deployment the rider removed or removal from the vehicle is accelerated when parawing catches air, and the rider is lifted in the air. The rider then descends to the ground, releases the harness and parawing device, and, most likely, walks away from the accident.

Although certain embodiments of the present invention have been disclosed herein with a great deal of particularity, these embodiments are provided to describe the invention and are not meant to be exhaustive or limit the invention. Upon review of the foregoing, numerous adaptations, variations and modifications of the disclosed embodiments will immediately present themselves to those of skill in the art. However, these will undoubtedly make use of the concepts shown herein and will employ the spirit of the present invention. Accordingly, reference should be made to the claims set forth below in order to ascertain the full scope of the present invention.

What is claimed:

1. Apparatus comprising:

a drag-inducing device affixed to a rider for lifting the rider from a vehicle and reducing the rider's velocity after separation from the vehicle;

an active deployment system connected to the drag inducing device; and a sensor system communicating with the deployment system, whereby the sensor system senses a crash condition and signals the active deployment system to actively deploy the drag-inducing device.

2. The apparatus of claim 1, wherein the vehicle is a motorcycle.

3. The apparatus of claim 1, wherein the drag-inducing device is a parachute.

4. The apparatus of claim 1, wherein the drag-inducing device is a parawing.

5. The apparatus of claim 1, wherein the drag-inducing device is connected to the rider by a harness comprised of a plurality of straps.

6. The apparatus of claim 5, further comprising a stress reduction ring disposed between the drag-inducing device and the rider.

7. The apparatus of claim 1 wherein the deployment device comprises a receiver and a quantity of pressurized gas, wherein the receiver activates a mechanism for releasing the pressurized gas.

8. The apparatus of claim 7, wherein the receiver is a wireless receiver.

9. The apparatus of claim 1, wherein the sensor system comprises a transmitting unit connected to one or more sensors.

10. The apparatus of claim 8, wherein the sensor system comprises a wireless transmitting unit connected to one or more sensors.

11. The apparatus of claim 1, wherein the sensor system comprises one or more tether sensors for determining when the rider is removed from the vehicle.

12. The apparatus of claim 1, wherein the sensor system comprises one or more vehicle tilt sensor devices.

13. The apparatus of claim 1, wherein the sensor system comprises one or more sensor means for determining that a crash is imminent.

14. Apparatus for safely removing a rider from a moving motorcycle and reducing the rider's velocity, comprising:

a means for increasing the drag of the rider said means for increasing drag being affixed to the rider;

active deployment means for actively deploying the means for increasing drag; and sensor means for communicating with the deployment system, whereby the sensor means senses an imminent crash condition and signals the deployment means to actively deploy the means for increasing drag to lift the rider from the vehicle and reduce the rider's velocity.

15. A method of decreasing the velocity of a rider thrown from an open cockpit vehicle comprising the steps of:

attaching a device comprising a drag-inducing device and an active deployment system to the rider;

sensing a crash and creating a crash signal;

relaying the crash signal to the deployment system; and actively deploying the drag-inducing device to remove the rider from the vehicle and to reduce the velocity of the rider.

16. The method of claim 15, further comprising the steps of attaching a tether between the rider and the vehicle; and activating the deployment system when the tether is detached from between the rider and the vehicle.

17. The method of claim 15, further comprising the steps of sensing the tilt of the vehicle; comparing the tilt to a predetermined maximum tilt level; and activating the deployment mechanism if the maximum tilt level is exceeded.

18. The method of claim 15, further comprising the steps of sensing the proximity of the vehicle to other objects; determining if a crash is imminent; and activating the deployment mechanism if a crash is imminent.

19. The method of claim 15, wherein the step of deploying the drag-inducing device comprises releasing a quantity of compressed gas.

20. The method of claim 15, wherein the step of attaching a device comprising a drag-inducing device and a deployment system to the rider comprises attaching a harness comprised of a plurality of straps to the rider.

\* \* \* \* \*